T. G. PLANT.
MACHINE FOR TREATING INSOLES.
APPLICATION FILED JAN. 24, 1908.

1,122,218.

Patented Dec. 22, 1914.
7 SHEETS—SHEET 3.

WITNESSES:
Roswell F. Hatch.
Redfield H. Allen

INVENTOR,
THOMAS G. PLANT,
BY Robt. P. Harris,
ATTY.

T. G. PLANT.
MACHINE FOR TREATING INSOLES.
APPLICATION FILED JAN. 24, 1908.

1,122,218.

Patented Dec. 22, 1914.
7 SHEETS—SHEET 4.

WITNESSES:
Roswell F. Hatch.
Redfield H. Allen

INVENTOR.
THOMAS G. PLANT,
BY 
ATT'Y.

T. G. PLANT.
MACHINE FOR TREATING INSOLES.
APPLICATION FILED JAN. 24, 1908.

1,122,218.

Patented Dec. 22, 1914.
7 SHEETS—SHEET 5.

WITNESSES:
Roswell F. Hatch
Redfield H. Allen

INVENTOR.
THOMAS G. PLANT,
BY Robt P. Harris
ATT'Y.

UNITED STATES PATENT OFFICE.

THOMAS G. PLANT, OF BOSTON, MASSACHUSETTS, ASSIGNOR TO UNITED SHOE MACHINERY COMPANY, OF PATERSON, NEW JERSEY, A CORPORATION OF NEW JERSEY.

MACHINE FOR TREATING INSOLES.

1,122,218.   Specification of Letters Patent.   Patented Dec. 22, 1914.

Application filed January 24, 1908. Serial No. 412,391.

*To all whom it may concern:*

Be it known that I, THOMAS G. PLANT, a citizen of the United States, residing at Boston, in the county of Suffolk and State of Massachusetts, have invented an Improvement in Machines for Treating Insoles, of which the following description, in connection with the accompanying drawings, is a specification, like letters on the drawings representing like parts.

The invention to be hereinafter described relates to machines for acting upon the soles of boots and shoes, and more particularly for treating insoles and preparing them for subsequent operations in boot and shoe making.

As is well known by those skilled in the art, insoles for use in the manufacture of welted boots and shoes are usually provided with a lip or projection extending from a point near the back of the heel on one side, along the shank and forepart, to a corresponding point near the back of the heel on the other side. Owing to the character of the insole material and the action of the tools thereon, it is found that the formation of this lip or projection usually lengthens the insole somewhat, so that an insole cut to a desired size becomes longer in actual length during the formation of the lip or projection. Obviously, this increased length is an objection in assembling and subsequent operations, and the greater the increase of length due to the lip formation, the more pronounced the objection. The upper, the last, and insole having been assembled, the heel portion of the upper is drawn over the insole, overlying the lip or projection, and secured by tacks or other metal fastenings. Thereafter the welt and upper are secured to the lip or projection by a line of stitches or like fastening means, extending from a point near the breast line of the heel on one side, along the shank and forepart, and back to a corresponding point near the breast line of the heel on the other side. In order that the line of stitches connecting the welt, upper and insole be properly positioned, it is necessary that the channel guide of the welter be admitted under the lip and well into the channel near the points where the lip is already held down by the tacks securing the heel portion of the upper to the insole, and it is likewise a matter of importance that the line of tacks does not extend sufficiently forward to interfere with the proper location of the welt or with the welting operation. On the other hand, the beginning and ending of the line of tacks, as well as the beginning and ending of the line of stitches connecting the welt, upper, and lip vary with the different length and width sizes of the soles, the different styles of soles, and the different heel styles, and the same is true with respect to the actual length of the same length size when it varies in width or style, all as will be more fully treated hereinafter.

With these and other considerations in view, the objects and aims of the present invention will be best understood and appreciated from the following description and accompanying drawings of one form or embodiment of the invention selected for illustrative purposes, the scope thereof being definitely set forth in the claims.

Referring to the drawings.

Figure 1:
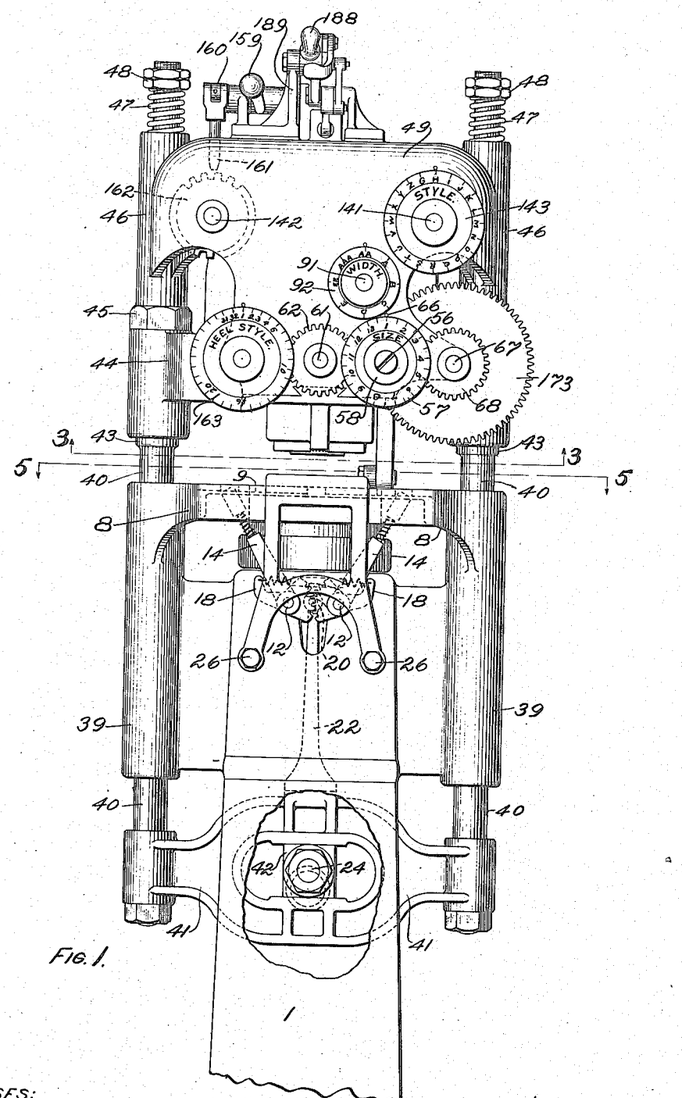
—Figure 1 is a front view in elevation of a machine embodying one form of the present invention, the lower portion of the frame-work being broken away.
Figure 2:
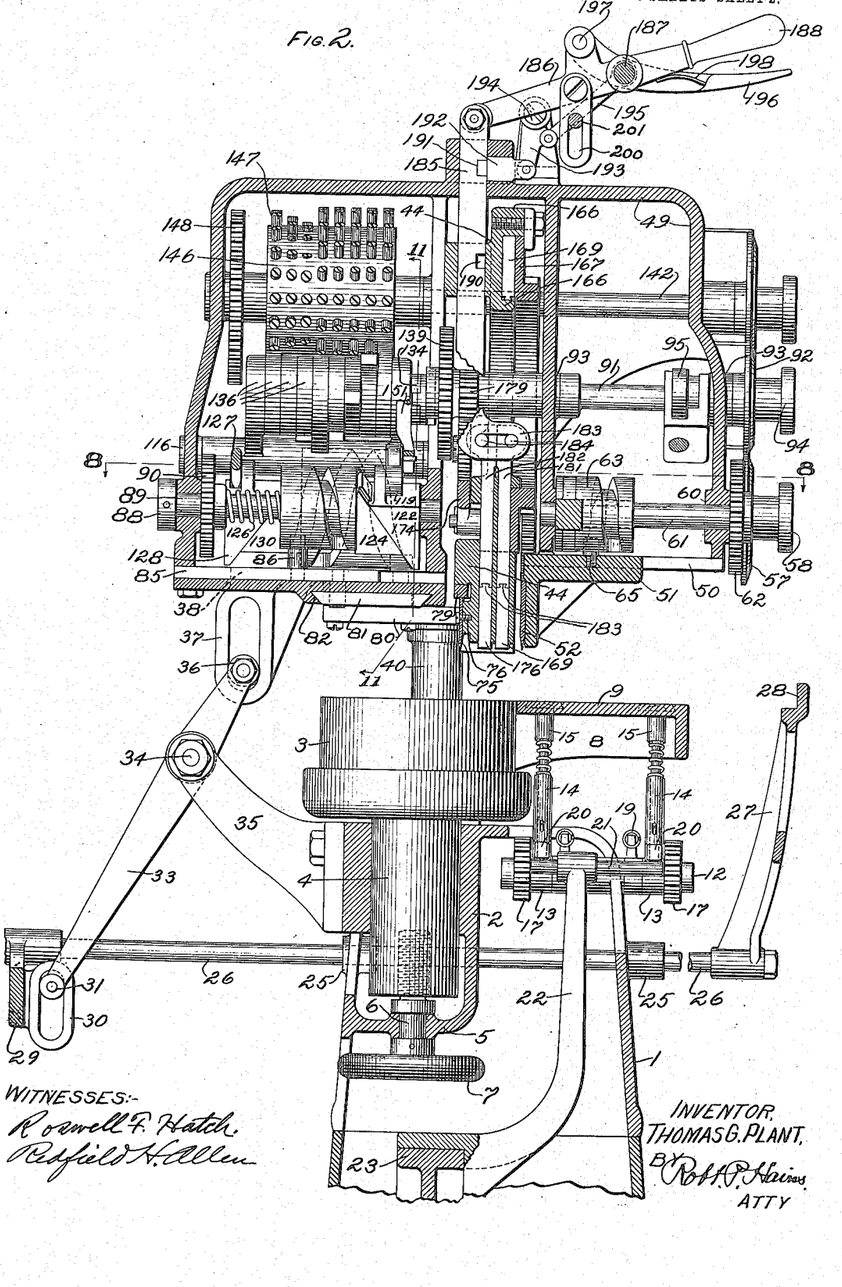
Fig. 2 is a central vertical section looking to the right in Fig. 1.
Figure 17:
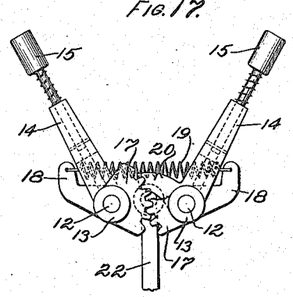
Fig. 17 is a detached front view of the sole positioning fingers and their operating connections.

Referring to Figs. 1 and 2 of the drawing, the lower supporting framework 1 may be of any desired form or character for sustaining the machine parts. Mounted in the framework 1 is the dinker block 3, preferably provided with an extended cylindrical portion 4 sustained in a bearing 2, the lower portion of which affords a seat 5 for an adjusting device by which the dinker block may be raised or lowered as desired. In the present illustration the adjusting device consists of a stem 6 having a collar bearing on each side of the seat 5 and screw threaded into the lower end of the cylindrical portion 4 of the dinker block, a hand wheel 7 affording means whereby the stem 6 can be rotated to raise or lower said block. By reason of the described mounting of the dinker block it is evident that it can be rotated from time to time to present a new cutting surface to the tool to be described and can be adjusted up or down by the hand wheel 7 to preserve its proper height position. Secured to the frame or pedestal 1 are the bracket arms 8 carrying the table 9 (Figs. 1 and 5), said table being provided with transverse slots 10, 10, preferably two in number, in which reciprocate the slides 11, 11. Mounted in the frame or pedestal 1 are the two parallel stud shafts 12, 12, each carrying two loose sleeves 13, 13 (Figs. 1, 2 and 17) from which project the sole positioning elements each comprising a tubular portion 14 into which telescopes the spring supported finger 15, the upper end of which extends through a perforation 16 in one of the slides 11.

As will be obvious from Figs. 1, 2, 5 and 17, the sole positioning fingers on the respective shafts are disposed opposite each other or in pairs, and the fingers of each pair are operatively connected by means of the segment racks 17 secured to their respective sleeves 13, whereby rotative movement of either finger imparts corresponding movement to the other of the pair to cause them to approach or separate. Extending from the sleeves 13 of each pair are the arms 18 connected by a spring 19, which normally tends to rotate the positioning fingers of each pair toward each other. In order to separate the fingers of each pair, the sleeve 13 of one finger of each pair is provided with an arm 20, which bears upon an actuating pin 21 carried by an actuator 22 extended downward, Figs. 1 and 2, and connected to an eccentric 23, Fig. 2, on the main drive shaft 24.

Figures 5, 6, 7, 16:
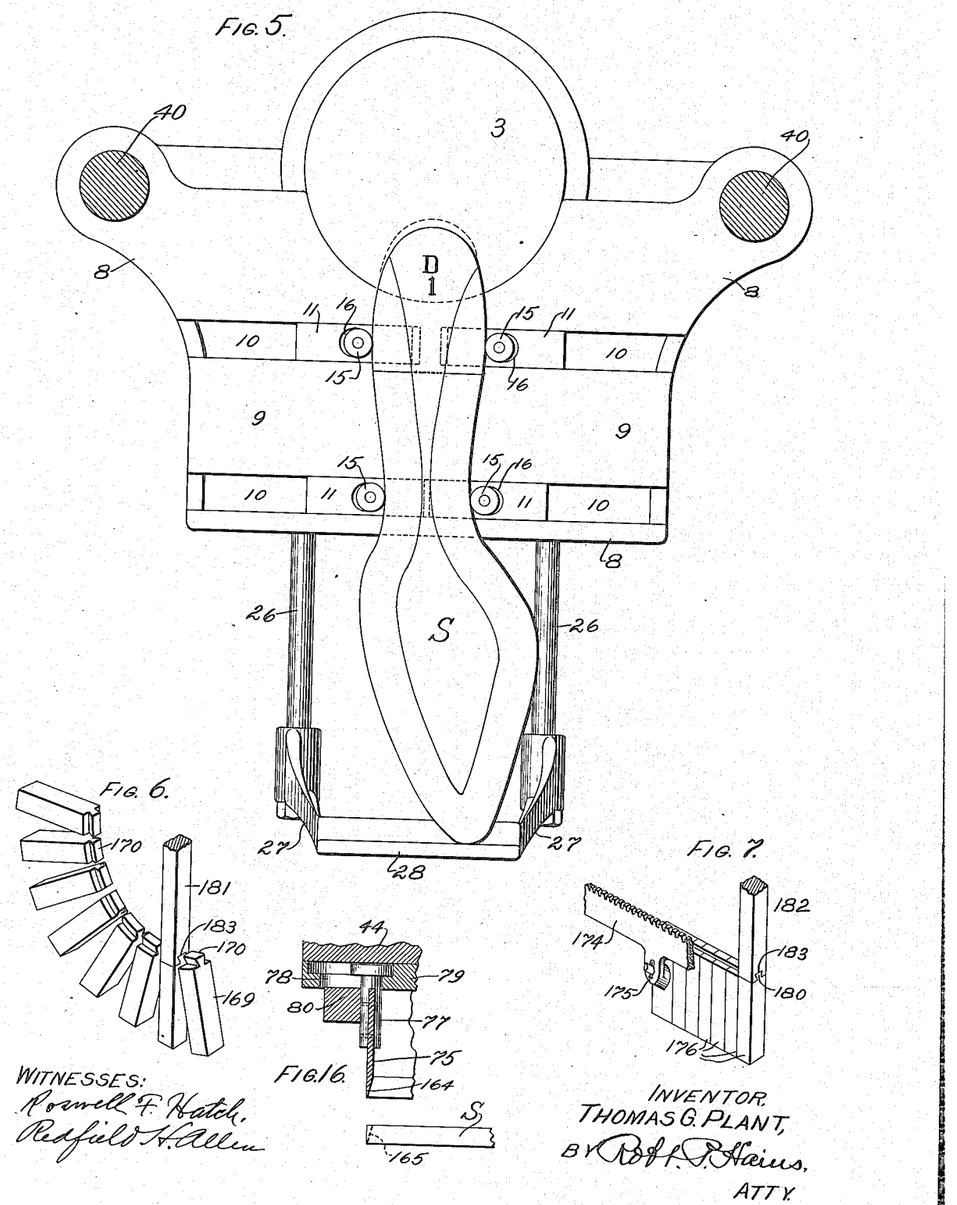
Fig. 5 is a sectional plan view on the line 5—5, Fig. 1, showing an insole in position for treatment.
Figs. 6 and 7 are detail views of the size and width stamping features showing the relation of the stamps with the stamp carrier.
Fig. 16 is a sectional detail showing the heel contour knife mounting.

From the construction thus far described it will be obvious that, if the fingers 15 of each pair are separated by the actuator 22 being moved to its raised position, and a sole, as S, Fig. 5, is placed between the fingers 15 of the respective pairs, and then the actuator is lowered, the springs 19 will act to move the fingers of each pair toward each other until they contact with the sole edge, as indicated in Fig. 5, the slides 11 being also moved in like manner beneath and to support the sole along the line of the slots 10.

It will be noted in Fig. 5 that the sole positioning fingers contact with and position the sole at points to the rear of the ball line where little or no substantial variation in edge contour exists between rights and lefts, so that without change in their action, the positioning fingers serve to properly locate a sole regardless of its being for a right or left shoe, such positioning being effected by the action of springs 19 on the independently operated pairs of fingers 15. The fingers 15 may be appropriately termed side gages. The sole being thus positioned transversely with respect to the machine and its tools, as will more fully appear, it is next in order to position the sole in a longitudinal or lengthwise direction to properly present its heel portion for treatment.

In bearings 25, 25, Fig. 2, of the machine frame are supported the toe-gage rods 26, 26, Figs. 1 and 5, adapted to slide longitudinally and carrying at their front ends the toe-gage, preferably comprising the arms 27 secured to said rods and supporting between them in the plane of the table top 9, the toe contacting and supporting portions 28. It will be noted that this portion 28 extends some distance to either side of the median line passing through the table and dinker block, so that the toe portion of a sole will be properly supported and moved by the toe gage regardless of its being for a right or left shoe or its style. At the rear, the rods 26 are joined by a cross piece 29 having a slotted bracket 30, Fig. 2, engaged by a roll or pin 31 carried by the toe-gage lever 33, pivoted at 34 to a bracket 35 secured to the machine frame, and engaging at its upper end, by a roll or pin 36, with a slotted arm 37 of a slide 38, Figs. 2 and 14. The movements of this slide for adjusting the toe gage will be hereinafter fully described, it being sufficient at this time to note that movement of the slide 38 back and forth in its guideway 39, Fig. 14, will cause the toe-gage lever 33, and through it the toe-gage 28, to be moved toward or from the table 9.

One of the aims of the present invention is to provide the insole with a transverse cut through the lip to permit the latter to be turned abruptly upward near the heel breast line that the channel guide of the welter may properly engage the channel of the insole. As will be appreciated by those skilled in the art, several important results, in addition to that noted, follow from thus cutting the lip transversely, provided the line of cut is properly positioned in response to the length size, width size and heel style. As a matter of fact, this transverse line of cut through the lip should be positioned a short distance in rear of the heel breast line, and this relation should remain undisturbed, notwithstanding variations in size or width of sole and variations in style of heel to be used; in other words, this transverse line of cut should be disposed a certain distance from the heel end of the sole, and this distance will vary under different conditions of sole size and heel style. Provisions have, therefore, been made to trim the heel edge of the sole and form the transverse cut by means of two relatively adjustable knives, one of which will be denominated the heel contour knife and the other the lip cutting knife, said knives preferably, though not of necessity, acting simultaneously upon the sole. Obviously, relative adjustment of these knives toward or from each other will vary the position of the transverse cut from the extremity of heel portion of the finished sole, and if this variation is determined by the size and width of sole, and style of heel to be employed, the transverse line of cut will be properly positioned for the particular sole operated upon.

Referring to Fig. 1, the pedestal 1 has projecting therefrom suitable bearings 39, 39 for the rods 40, 40, which at their lower ends are connected by a cross-head 41 operated from the drive shaft 24 by any suitable means for imparting to the cross-head and rods 40, 40 a vertical reciprocating motion, as, for instance, by the slide 42 carried in transverse ways on the cross-head and connected to the drive shaft 24 by a crank, as indicated. Secured to the rods 40, 40 above the shoulders 43, 43 is a yoke 44, Figs. 1, 2 and 10, held seated upon said shoulders 43, 43 by nuts 45, 45, so that said yoke is positively raised and lowered with the rods 40, 40. Seated upon the top of the nuts 45, 45 are the sleeves 46, 46, normally held in such position by means of the springs 47, 47 interposed between the sleeves 46, 46, and adjusting nuts 48, 48, screw-threaded upon said rods 40, 40. The effect of this construction is that while the yoke 44, which carries the heel contour knife to be described, is positively moved downward by the rods 40, 40, to cut through the sole material, the sleeves 46, 46 and the head 49 carried thereby may yield slightly under the demands of the sole due to varying thickness, as will later appear.

Figure 9:
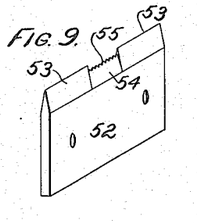
Fig. 9 is a detached detail view of one form of lip cutting knife, in this case said knife having a sole marking portion.

Mounted in suitable ways 50 in the head 49, Fig. 2, is the lip knife carrier 51, having secured thereto the lip cutting knife 52 which extends in a direction transverse to the sole to be cut. The lip cutting knife is best shown in detached detail in Fig. 9, its cutting edge being turned upward to more clearly show its construction. As apparent from Fig. 9, the lip cutting knife has two cutting edges 53, 53, separated by a recessed portion 54 having impressing or stamping teeth 55.

As hereinbefore intimated, the purpose of the lip cutting knife is to cut the lip of the insole on a line approximating the breast line of the heel regardless of the varying sizes and widths of soles or the styles of heel employed. It follows that this transverse cut would in many cases serve as a guide for the operative in tacking the upper about the heel portion of the last and for the commencement and finish of the welt stitching operation, but inasmuch as this cut is not always clearly visible, or that it may be hidden by the overlying edge of the upper, it has been found expedient to indent or mark the surface of the sole between the lips, and this is accomplished by the impressing teeth 55 at the same time the knife cuts the lip. Obviously, these impressing teeth 55 may be in the same transverse line of the sole as the lip cuts, or they may be varied from this position as desired. By transverse cuts is meant cuts across the lip in a general direction transverse thereof.

As is well known, there are twenty-six different length sizes and half sizes of soles, and having selected one of these to be treated by the machine and placed it upon the table 9 with the heel portions on the dinker block, as indicated in Fig. 5, it becomes necessary to adjust the relative position of the heel contour and lip cutting knives according to the particular size of sole selected. In the present form of the invention this relative adjustment of the two knives is effected by moving the lip cutting knife which will now be explained.

Figure 8:
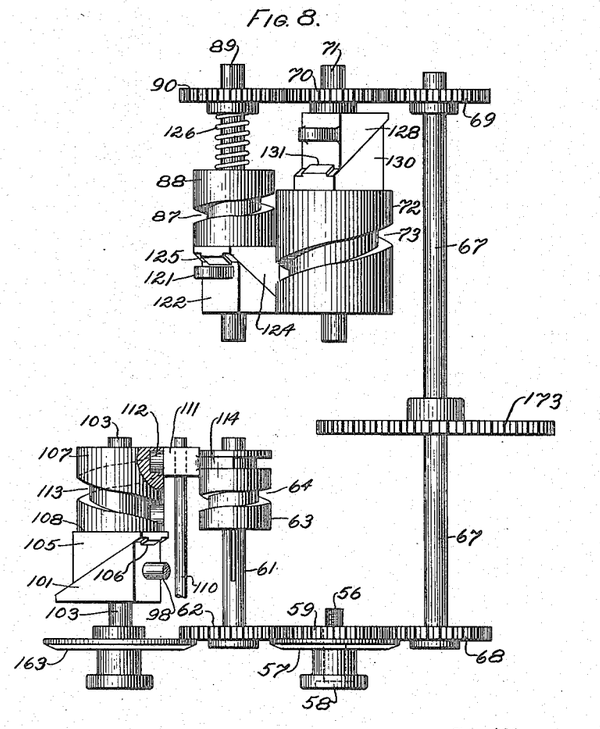
Fig. 8 is a detached plan view on the line 8—8, Fig. 2, showing the relation between various adjusting cams and their coöperating connections.

Mounted upon the stud 56, Figs. 1 and 8, secured to the head 49, so as to rotate freely, is a size disk 57 provided with a hand wheel 58, and having secured thereto the gear 59, said size disk being provided with a series of graduations, Fig. 1, twenty-six in number, representing the usual length sizes of shoes or shoe soles. Rotatably mounted in bearings 60 in the head 49 is the shaft 61, Figs. 1, 2 and 8, provided with a gear wheel 62, meshing with the gear 59, and having splined upon it, so as to rotate therewith but be longitudinally movable thereon, by means to be described, the cam 63. Said cam 63 has a cam path 64 engaged by a roll or pin 65, Fig. 2, projecting upward from the lip knife carrier 51. By this construction it will be clear that rotation of the size disk 57 to bring the appropriate size mark to the reference pin or mark 66, Fig. 1, in conformity with size of the sole selected for treatment, will impart movement to the carrier 51 and its knife 52 in a direction longitudinally of the sole upon the table 9.

Figure 10:
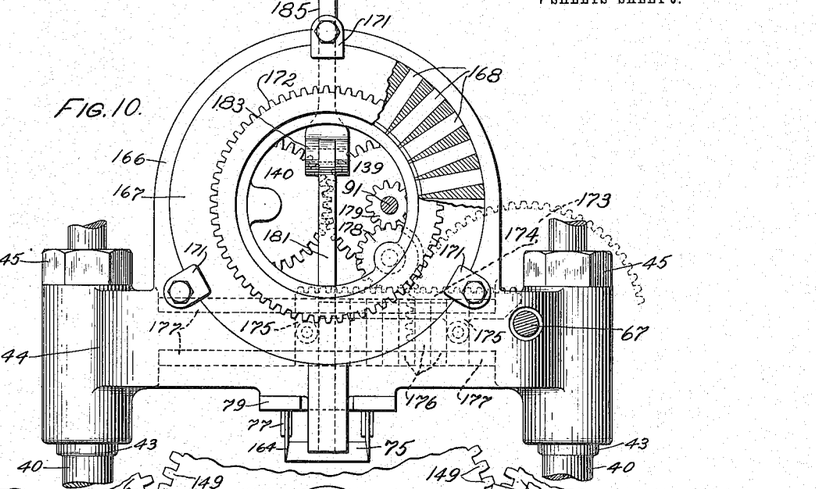
Fig. 10 is a detached detail in front elevation, with parts broken away, of the stamp setting devices, and their operating connections.

The toe end of the sole having been placed upon the toe-gage 28, it is desirable to adjust the toe-gage to properly position the sole upon the table and dinker block for the action of the heel contour and lip cutting knives which, in the present form of the invention, is accomplished as follows: Journaled in the head 49, Figs. 1, 8 and 10, is a shaft 67 having a gear wheel 68 fixed thereto and meshing with the gear wheel 59 secured to the size disk 57. At its opposite end the shaft 67 carries a gear 69 meshing with a similar gear 70, secured to a short shaft 71 rotatably mounted in the head 49, and having splined thereon a cam 72 provided with the cam path 73, Figs. 8 and 14, the latter being engaged by a roll or pin 74, projecting from the toe gage slide 38, movement of which by rotation of the cam 72 will move the toe gage 28 in appropriate direction through the lever 33 and connections as described.

Not only must the lip cutting knife and toe gage be adjusted in accordance with the length size of the sole to be treated, but the heel and its contour must be brought into harmony with the demands of that particular size of sole, and to this attention will now be directed.

Figure 3:
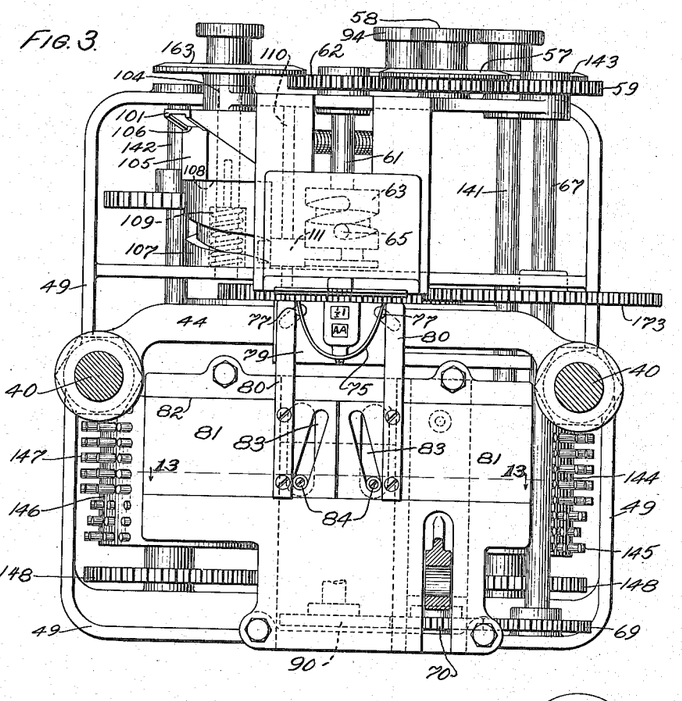
Fig. 3 is a horizontal section on the line 3—3 of Fig. 1, looking upward.

Referring to Figs. 2 and 3, the heel contour knife 75 has its central part secured at 76 to the yoke, and its ends bent or turned in a forward direction approximately to the shape of a horse shoe, the resiliency of the knife material normally tending to straighten the knife, the ends whereof have attached guide pins 77 which extend upward through the inclined slots 78, Fig. 16, in the plate 79, the heads of said pins bearing upon the under surface of yoke 44. Bearing upon the outer sides of pins 77 are two arms 80, each secured to its appropriate sliding carrier 81, 81, comprising a plate, Figs. 2, 3 and 13, adapted to slide transversely of the head 49, in suitable ways 82. Each of these plates or carriers 81 has an inclined or diagonal slot 83, engaged respectively by a pin 84, Figs. 3 and 13, projecting downward from a slide 85, provided with an upwardly projecting pin 86 which travels in the cam path 87 of a cam 88, splined to a shaft 89, Figs. 8 and 13, suitably journaled in the head frame 49, Fig. 2. To the shaft 89 is secured the gear wheel 90, meshing with the gear 70, Fig. 8, and deriving motion, through the connections hereinbefore described, from the size disks 57 and its attached gear 59, Fig. 8. From this it will be clear that simultaneously with the adjustment of the lip cutting knife and toe gage by the size disk 57, there will be rotation imparted to the cam 88, which through the carriers or slide plates 81, and arms 80, will cause the heel contour knife 75 to be adjusted to the character or contour of heel demanded by the size of sole being treated, and upon descent of the head 49 and yoke 44, it is evident that the sole positioned on the table and dinker block will have its channel lip cut in a general direction across the same, and the heel contour trimmed to the requirements demanded by size adjustment. Shoe soles, however, not only differ in length in accordance to the various length sizes, but each length size varies in width, there being ordinarily eight different widths for the same length size, and the same length size of sole differs somewhat in actual length in accordance with the variations in widths. For instance, a No. "4" length size of sole may have eight different widths, and for each of the different widths, the actual length of this No. "4" sole will vary, a No. 4-C being of a slightly different length from a No. 4-D, as will be readily understood by those skilled in the art. In addition to these variations there are a number of different styles, ordinarily twenty, so that besides the adjustments for standard length size hereinbefore described, there is provided by this invention means for correcting or adjusting the parts for variation due to differences in width and differences due to change of style. The former will first be described under the general designation of width adjustment. Since for differences in width the same length size of sole will vary in length, it is necessary to adjust the lip cutting knife to maintain its proper position with respect to the heel breast line; also the heel contour knife to properly shape the heel contour; and the toe gage.

Referring to Figs. 1 and 2, the shaft 91, mounted in suitable bearings 93 in the head 49, has secured to it an index wheel 92, Fig. 1, graduated for the various widths of shoe soles to be treated and provided with a hand wheel 94 by which it may be turned. Secured to the shaft 91 is an edge cam 95, Figs. 2 and 4, which engages a pin or roll 96 on a slide 97, the end of which is bifurcated, as shown, to embrace the shaft 91 and thereby guide the slide 97 in its movements. From the slide 97 projects the slide rod 98, which passes through a guide lug or bracket 99 secured to or formed as part of the head 49, said slide rod 98 and slide 97 being normally forced toward the shaft 91 by a spring 100 to thereby maintain the roll or pin 96 in engagement with the cam 95. At its lower end the rod 98 carries a wedge 101, provided with a slot 102 embracing the shaft 103 suitably journaled at 104, Fig. 3, in the head 49, the construction being such that under the action of cam 95, slide 97 and connections, the wedge 101 may be moved transversely of the shaft 103. Loosely mounted on the shaft 103, Fig. 8, but having no transverse movement with respect thereto, is a wedge 105, arranged reversely to said wedge 101, the two wedges 101 and 105 being preferably connected together by dovetailed sliding engagement, 106, as shown in Figs. 3 and 8. Splined or keyed to the shaft 103 is a cam 107, Figs. 3 and 8, said cam 107 while rotative with said shaft 103 being movable longitudinally thereon, and normally pressed in engagement with the flat face 108 of the wedge 105, by a spring 109, Fig. 3, preferably seated in a recess of said cam 107. Mounted in the head 49 is a rod 110, disposed, as shown in Fig. 8, between the shafts 61 and 103. Sliding upon the rod 110 is a collar or slide block 111, carrying a roll or pin 112 which engages with the cam path 113 of the cam 107. Projecting from the opposite side of the block is the yoke 114 which engages a circular groove in the cam 63, which, as hereinbefore described, is rotatable with but slidable on the shaft 61. From the construction described, it will be obvious that upon movement of the wedge 101 transversely of the shaft 103, the cam 107 will be moved lengthwise or longitudinally of its shaft 103 and through the sliding block 111 will correspondingly move the cam 63 longitudinally of its shaft. The cam 63, however, engages the roll 65 on the lip cutting knife carrier 51, so that by adjustment of the shaft 91 to compensate for the width of shoe sole being treated, the lip cutting knife, already adjusted for the particular length size of sole, will be further adjusted to compensate for differences of actual length due to differences in width. It becomes now desirable to adjust or correct the position of the heel contour knife and toe gage corresponding to the variations of the sole due to differences in widths.

Figure 11:
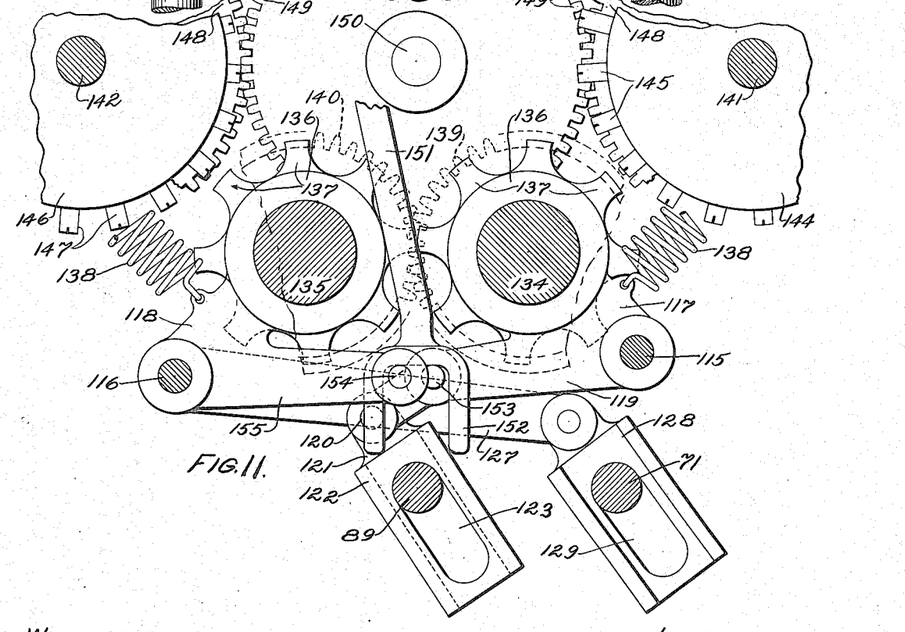
Fig. 11 is a detail sectional view on line 11—11, Fig. 2, to show the connection and relation of parts relating to the width and style adjusting devices.
Figures 12, 13, 14, 15:
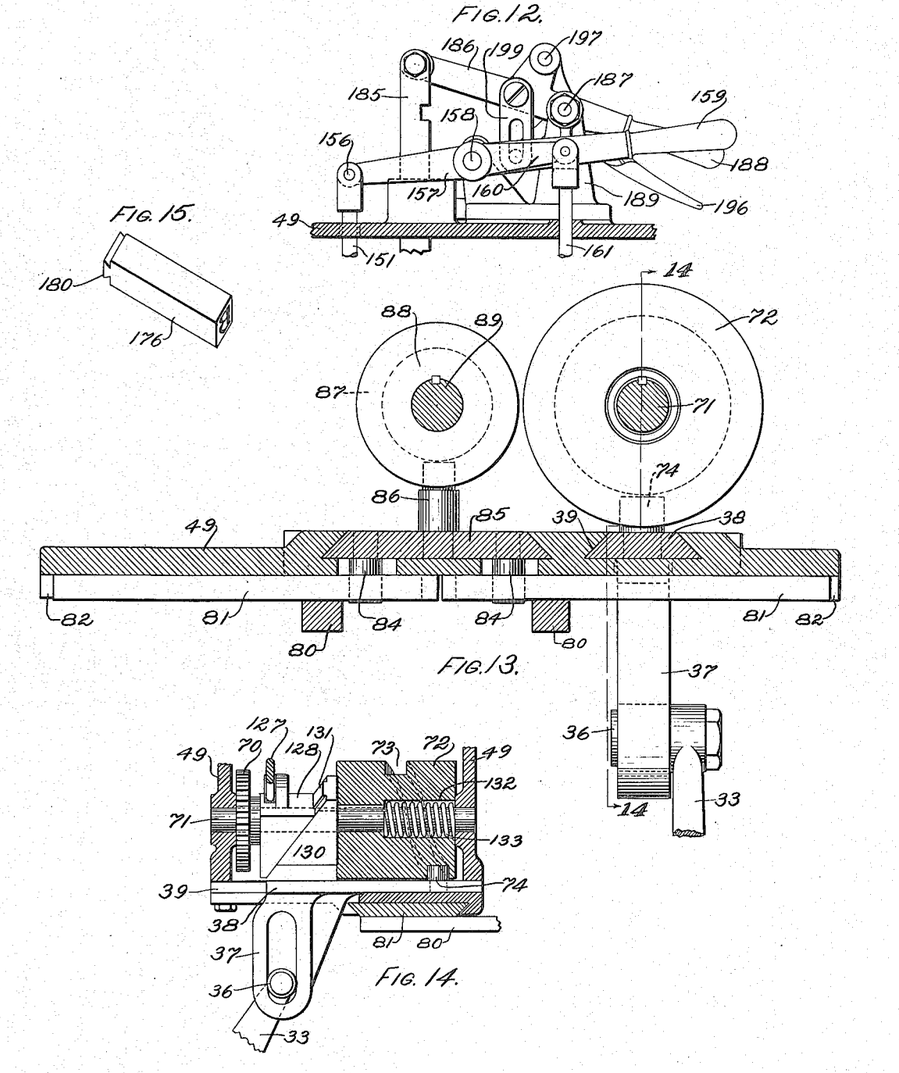
Fig. 12 is a side elevation of the operating and locking devices for the stamp carrier, and the connections to the style controller, parts being broken away and the casing top being shown in section.
Fig. 13 is a vertical section on the line 13—13 of Fig. 3, said section being confined to the parts for varying the toe gage and heel contour knife.
Fig. 14 is a detail sectional view on line 14—14 of Fig. 13.
Fig. 15 is a detached view of one of the marking stamps.

Referring to Figs. 2 and 11 of the drawing, 115 and 116 indicate two stud shafts supported in the head 49, upon which are fulcrumed the bell crank levers 117 and 118, respectively, best shown in Fig. 11. The horizontal arm 119 of bell crank 117 is connected at 120 with an arm 121 extending to and carrying a wedge block 122, said wedge block being provided with an elongated slot 123 which embraces the shaft 89, Fig. 11, on which shaft is mounted the cam 88, heretofore described as controlling the heel contour knife. Reversely arranged upon the shaft 89 and loosely mounted thereon is the wedge 124 having a sliding dovetailed engagement 125 with wedge 122. The cam 88 is normally pressed against the flat face of the wedge 125 by means of the spring 126 surrounding the shaft 89, Fig. 8, and interposed between the cam 88 and the hub of the gear wheel 90. From this construction it will be apparent that movement of the bell crank lever 117 upon its fulcrum 115 will cause a sliding movement of the wedge 122 and corresponding movement to the cam 88 controlling the heel contour knife, the result being that such longitudinal movement of the cam 88 which is splined to its shaft, as indicated in Fig. 13, will cause the slides 81 and their knife controlling arms 80 to be actuated to properly correct the curve of the heel contour knife to correspond to variations in the sole due to change in width. Likewise connected to the horizontal arm 127 of the bell crank lever 118 is a wedge 128, Figs. 8 and 11. This wedge has an elongated slot 129 embracing the shaft 71 on which is slidably mounted the cam 72 operatively connected to the toe gage. Loosely mounted upon the shaft 71 and reversely arranged with respect to the wedge 128, is a corresponding wedge 130 having a dovetail sliding connection 131 with wedge 128, Fig. 14. The cam 72, shown in section in Fig. 14, is provided with a central recess 132 in which is seated a spring 133, one end of which bears against the head frame 49 and the other against the opposite end of the recess 132, said cam 72 being splined upon its shaft so that the spring 132 normally tends to move the cam 72 into engagement with the wedge 130. From this construction it will be apparent that movement of the wedge 128 transversely of the shaft 71 will cause the cam 72 and its connected toe operating gage slide 38 to be correspondingly moved to thereby, through the lever 33 and its connections, move the toe gage toward and from a table 9. Mounted on the upwardly extending arms of the two bell crank levers 117 and 118 are the two shafts, 134, 135, Fig. 11, each of said shafts carrying a series of collars 136, each of said collars having a projecting lug portion 137, varying in lengths, the collars themselves being fixed relative to each other upon their respective shafts, as indicated in Figs. 2 and 11. It will be noted upon reference to Figs. 2 and 11 that there are eight of these collars on each of said shafts 134, 135, corresponding in this respect to the eight different widths employed for each size of shoe sole. Connected at one end to the bell crank levers 117 and 118 are the springs 138, 138, one for each of said levers, the other ends of said springs being connected to the head frame 49, whereby the said levers are normally subjected to forces tending to turn them in an upward direction about their respective fulcra 115 and 116. It will now be apparent that if the respective shafts 134 and 135 be rotated to bring a projection of one of the collars 136 corresponding to the width of the sole being treated into position to engage a stop, and if the bell crank levers be then allowed to turn about their fulcra, that the projections 137 will define the movement of the heel contour knife and toe gage controlling devices to move these parts as called for by the particular width of sole being treated. In order to secure this rotation of the two shafts 134, 135, the shaft 91, Fig. 2, which is in substantial alinement with the shaft 134 is provided with a gear wheel 139 which meshes with a corresponding gear wheel 140, Fig. 11, mounted upon the stud shaft parallel to shaft 91. Thus rotation of the width index 92 will cause corresponding rotation to the two shafts 134 and 135 through their gearing connections. Inasmuch, however, as the shafts 134, 135 are carried by the bell crank levers 117 and 118 respectively, there is provided between the shafts 134, 135 and the shafts carrying the gear wheels 139, 140 an "Oldham" or other clutch connection of well known type which will permit lateral movement of the shafts 134, 135 while maintaining operative connections with their respective actuating shafts.

While, as above stated, the collars 136 and their respective projecting portions provide adjustments for the heel contour knife and toe gage for variations due to the eight different widths commonly used in shoe constructions, the invention herein comprises further means for varying the heel contour knife and toe gage to correspond with the width and length variations of sole due to different styles of soles and to this attention will now be directed.

Mounted in the head 49 are the two shafts 141, 142 which extend, as shown in Fig. 3, from the front to the rear of the head. On the shaft 141, Fig. 1, is mounted an index wheel 143 designating the style of shoe sole to be operated upon, the number of such styles being appropriately 20. Secured to the shaft 141 at its rear portion is a cylinder 144 having a series of pins 145 arranged in twenty rows corresponding to the styles of the soles to be treated, there being eight of such pins in each row corresponding to the eight different widths of shoe soles for each style. These pins 145 are appropriately adjustable in their cylinder 144 to provide suitable stops at varying locations according to the style widths for the projections 137 of the collars 136, hereinbefore described. Similarly disposed upon the shaft 142 at its rear portion is a cylinder 146 also provided with a series of pins 147 arranged in twenty rows circumferentially of the cylinder to correspond to the twenty selected styles of soles to be treated and eight of such pins being arranged in each longitudinal row to correspond to the eight different widths, such pins 147 being adjustable, as hereinbefore pointed out for the pins 145 on the cylinder 144.

From the construction described and by reference to Fig. 11 it will be noted that the cylinder 144, which for identification has been denominated the style width controller, will act through the collars 136 on the shaft 134 to control the heel contour knife, and that the cylinder 146 with its appropriate pins, which for identification may be denominated the style length controller, controls through the collars 136 on the shaft 135 the toe gage, so that in the adjustments of the cylinders 144 and 146 and their coöperating collars 136, there will be an adjustment of the toe gage and heel contour knife to correspond not only to differences in widths of any particular standard size length of sole, but likewise an adjustment for differences in "style width" and "style length", it being well understood by those skilled in the art that different makers select different styles of shoes with respect to length and different styles also as with respect to width, the invention in the present instance providing appropriate adjusting means for all of these variable conditions.

Each of the cylinders 144, 146 is provided with a pinion or gear wheel 148, 148, Figs. 3 and 11, which are driven in unison by an idler 149 disposed between them on a shaft 150, Fig. 11, so that by rotation of the style shaft 141 (Fig. 1), the index 143 on the shaft 141 (Fig. 1), the style width and style length controllers will be rotated to bring the appropriate style pins into position to be engaged by the projections 137 of the collars 136 on the shafts 134 and 135 to thereby define the heel contour and toe gage position.

In order to maintain the collars 136 on the shafts 134, 135 out of engagement with the style pins on the two cylinders 144, 146 during adjustment of the parts, there is provided an arm 151, Figs. 2 and 11, having its lower end bifurcated, as at 152, and engaging by said bifurcation a pin 153 on the arm 119 of the bell crank 117, and a pin 154 on an arm 155 operatively joined to the bell crank lever 118, so that by depression of the rod or arm 151, the lower arms of the bell crank will be forced downward carrying the two shafts 134 and 135 away from the cylinders 144 and 146. The rod or arm 151 extends upward, Fig. 12, through the head or casing 49 and is joined at 156 to a lever arm 157 fulcrumed at 158 and having an operating handle 159. The hub of the lever 157 is extended laterally, as shown in Fig. 1, and has secured to it an arm 160, from which extends downward a lock finger 161 adapted to engage in the teeth of a lock wheel 162 secured to the shaft 142, as best shown in dotted lines in Fig. 1.

From the construction thus far described, it will be apparent that the rod 151 can be forced downward against the tension of the springs 138 by means of the handle 159 and when so depressed that the lock pin 161 is raised from engagement of the lock wheel 162, thereby permitting rotation of the shaft 142 through its operating connections with the style wheel 143, as already explained. It will be likewise apparent that upon release of the handle 159, the springs 138 will force the rod 151 upward thereby lowering the lock pin 161 into engagement with its locking wheel 162, thus holding the shaft 142 and its connected devices from rotation, a condition obviously desirable since at this time the collars 136 have carried their projections 137 into coöperating relation with the pins 145 and 147 on the style width and style length controllers, and the heel contour knife and toe gage have been adjusted ready for the descent of the head 49 for action upon the shoe sole.

The invention herein described in connection with the selected embodiment thereof has thus provided means to be used singly or conjointly in the adjustment of a lip cutting knife and stamp, a heel contour knife and a toe gage for variations in the size length and size width as well also as for different styles both in length and width of shoe soles. The heels of shoes, however, vary in their style, some having the heel seat longer than others, for instance, and the invention, therefore, contemplates means in addition to those hereinbefore described for adjusting the lip cutting knife and stamp as demanded by the particular style of heel to be employed, so that the cut through the lip and the impression of the stamp shall still maintain their proper location with respect to the heel breast line, notwithstanding the variations in heel style to be employed.

Figure 4:
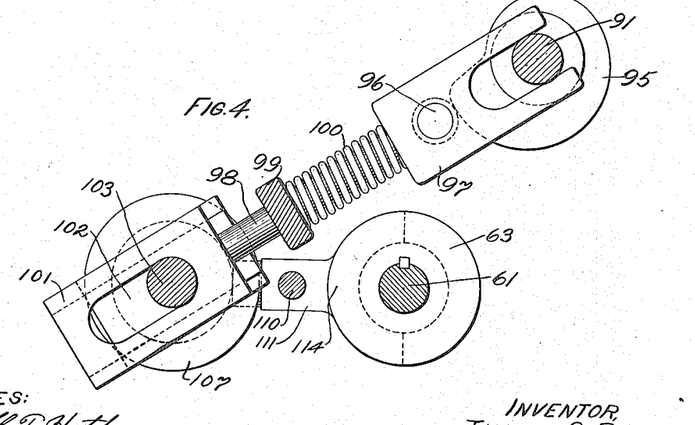
Fig. 4 is a detached detail view, partly in section, of the size, width, and heel style shafts and their associated connections as they would appear looking to the left in Fig. 2 with front hood or cover plate removed.

Having reference to Figs. 4 and 8, the shaft 103 carrying the cam 107 splined thereto, projects in front of the head or casing 49 and is there provided with an index wheel 163, Fig. 1, indicating "heel style" and varying from one to thirty-two, there being provision for thirty-two different heel style adjustments. Rotation of the index 163 will rotate the shaft 103 and with it the cam 107, thereby moving the block 111, which is in engagement with the cam path 113, longitudinally of its supporting rod 110, and correspondingly moving the cam 63 on the shaft 61 with which said block is engaged. This longitudinal movement of the cam 63 acts through the lip cutting knife carrier 51 to move the lip cutting knife 52 toward or from the heel end of the sole to be treated in accordance with the adjustment of the heel style index 163, as will be apparent.

In shaping the heel contour of an insole it is desirable that the edge of the sole, while being given the proper horizontal contour demanded by the size, style and other conditions of the sole, shall be inclined to the vertical, or, in other words, that the cut shall extend diagonally from surface to surface of the insole, so that when the upper is drawn over the edge of the insole, and the outer sole and heel applied, there will not be presented an abrupt angular portion marking the separation of the upper and heel portion of the shoe. With this general matter in view and referring to Fig. 16 of the drawings, it will be noted that the heel contour knife 75 is provided with a beveled cutting edge 164, the bevel of said edge facing toward the sole, the effect of which is that upon descent of the contour knife the cut through the insole will be in a direction diagonal to the surface of the sole, as indicated by the dotted lines 165, Fig. 16.

From the invention as thus described, it will be obvious to those skilled in the art that it contemplates either the conjoint or the separate use of the various instrumentalities operating upon the insole as hereinbefore described. The invention further contemplates that the sole which has been cut through the lip transversely or has had the heel contour properly trimmed and the position for the commencement and ending of the welter operation indicated by a stamp shall be provided with a mark or marks indicating the size and width of the sole. Obviously, to those skilled in the art, it is desirable that the size and width marks be placed upon the sole in such position that they shall always be free for inspection during the lasting operation and yet be hidden in the completed shoe.

Referring to Figs 2 and 10, the yoke 44 is provided with a circular recess forming an exterior circumferential and face bearing 166 for a type holder or wheel 167 having a series of divisions 168 open at each end, Fig. 10, for a series of type 169, Figs. 2 and 6, said type each being provided with a holding device at one end, preferably in the form of a dovetail projection 170, Fig. 6, and a stamp of suitable character at the opposite end. The type holder or wheel 167 is preferably held to its seat in the yoke 44 by cleats or clamps 171, Fig. 10, whereby it can be readily removed and replaced. Mounted on or secured to the holder 167, which in this form of the invention is represented as holding the type or impression devices to indicate the length size of sole, is a pinion or gear wheel 172 in operative engagement with the corresponding pinion or gear wheel 173 secured to the shaft 67 before described, so that rotation of said shaft 67 through the described train of mechanism from the size disk 57 will correspondingly rotate the type holder or wheel 167. Mounted on the yoke 44 is a rack 174 having downwardly projecting fingers 175 which embrace between them a series of type or markers 176 supported in horizontal ways 177, Fig. 10, formed on the yoke 44, whereby movement of the rack 174 transversely of the yoke will correspondingly move the type or markers 176. The teeth of the rack 174 are in engagement with the pinion 178, mounted on the yoke 44 and itself meshing with a pinion 179 on the width index shaft 91, Figs. 1, 2 and 10, whereby rotation of the width index 92 for adjustment or correction of the parts in accordance with the width of sole to be treated will cause the rack to move the type or markers 176 transversely of the yoke 44. The type or markers 176, like the type or markers 169, have one end provided with a dovetail projection 180, Fig. 7, and the opposite end provided with a suitable impressing device, that, in the present form of the invention, is intended to represent the different widths of soles to be treated. Mounted for reciprocation in the yoke 44 is the type carrier, comprising the two plungers 181 and 182, Fig. 2, connected at their upper ends to a slotted arm 183ª by pins 184, said arm being carried by a raising and lowering rod 185. The lower ends of the plungers 181 and 182 are provided with suitable means, as dovetail recesses 183, for engagement with the dovetail projections on the ends of the type. When the rod 185 is in its raised position, the lower ends of the plungers 181 and 182 are in position, as indicated in Figs. 6 and 7, to engage the ends of the type 169 and 176 as they are moved past the ends of the plungers by the holder 167 and rack 174, and when the proper size and width adjustment has been made, as hereinbefore explained, the two plungers, then in raised position, have engaged therewith type corresponding to said adjustments. To the upper end of the rod 185 is connected a lever 186, pivoted to a bracket 189, Figs. 1 and 12, at 187, and having a handle 188 by which said rod may be raised and lowered. The rod 185 when in either raised position, as indicated in Fig. 12, or in lowered position, as indicated in Fig. 2, should be locked against further movement in order that the plungers 181, 182 shall be maintained in proper position to cause the type carried thereby to be forcibly impressed against the sole, or so that the type may be moved through the ends of the plungers to bring the proper ones in engagement therewith. To this end various means may be employed.

In the present instance the rod 185, Fig. 2, is provided with the notches 190 and 191, adapted to be engaged by the plunger 192, connected to an arm 193, which is pivoted at 194, and connected by a pitman or link 195 to a spoon or trip 196, itself pivoted to the lever 186 at 197. A spring 198 normally acts to move the spoon or trip 196 in a direction to cause the plunger 192 to engage either recess 190 or 191 as it is presented thereto. When the rod 185 is raised and locked, as described, the plungers 181 and 182 do not interfere with the free movement of the type holders 167 and 174, but when it is moved to the lowered position the ends of the plungers move into the space formerly occupied by the type 169 and 176 then in position engaging the end of the plungers, and said type are moved downward through guides or perforations in the yoke 44 and held by the lock or catch 192 in such position, so that upon descent of the head 49 the type are brought into forcible contact with the upper surface of the insole and mark or stamp the same with the appropriate size and width mark.

It is desirable when the type holders are free to be moved for adjustment in accordance with the size and width of sole to be treated, that the rod 151 controlling the bell crank levers 117 and 118, Fig. 11, be also depressed, so that adjustment of the parts for variations in dimension of the sole may be made. To this end the lever 186, Fig. 12, is connected to the lever 157, which operates the rod 151, by a slotted link 199, which is pivoted to the lever 186 between its fulcrum 187 and its end, and provided with a slot 200 which engages a pin 201 connected to the lever 157 between its fulcrum 158 and handle 159, the effect of which is that if the handle 188 be depressed, Fig. 2, to raise the type carriers 181 and 182, the link 199 will first be lifted until the lower end of the slot 200 engages the pin 201, whereupon the lever 157 will be turned about its fulcrum 158, Fig. 12, depressing the rod 151 and lifting the locking pin 161 from engagement with the locking wheel 162, Fig. 1. On reverse movement of the handle 188, the type carriers 181 and 182 are depressed to carry their engaged type into marking position, and the lever 157 and rod 151, under the action of the springs 138, Fig. 11, are moved to permit the bell cranks 117 and 118 to turn about their fulcra 115 and 116 for the purposes hereinbefore described.

In the foregoing description the size disk 57 was first manipulated to properly position the lip cutting knife, the heel contour knife, the toe gage, and size markers or type; then the width disk 92 was manipulated to correct the position of the lip cutting knife, the heel contour knife, the toe gage for variations of sole dimension due to variations in width and to place the width markers or type in marking position; then the style disk 143 was manipulated; and, thereafter, the heel style disk 163; but it is to be understood that this order of manipulation is not essential, it being selected as a more convenient method for description only. Indeed, any order or sequence of adjustment may be followed, and in practice the style disk 143 would first be manipulated, followed by the heel style adjustment, then the adjustment for length size, and, finally, that for width.

In the disclosure of the invention by the specification and drawings, no attempt has been made to refer to the many changes that may suggest themselves to the skilled mechanic and those skilled in the art, it being understood that the invention is not circumscribed by the details of structure but is generic in character as pointed out and definitely set forth in the claims.

From the characteristics underlying the present invention it will be clear that in operation, a sole having been placed upon the table 9 and its toe resting on the toe gage, the various size, style, and width adjusting means will first be set to correspond to the insole to be treated or the heel to be used, and that the type will be set to bring into stamping position the proper character to indicate the size and width of insole, whereupon the type carrier and style adjusting shafts will be locked. The drive shaft 24 being now rotated will cause the yoke 44 and head 49 to descend, carrying with them the lip cutting knife, the heel contour knife, the stamp for placing the guide mark upon the insole, and the size and width type into contact with the insole for the purposes already stated. The lip cutting knife 52 will cut a slash through the lip across or substantially transverse thereto, said cut extending sufficiently toward the base of the lip to permit the latter to be turned upward so that the channel guide of the welter may enter well into the channel on commencement of the welting operation; and when employed in connection with the heel contour knife, it will define the length of heel seat of the insole for varying sizes or styles of insole and heels. The stamping points 55, Fig. 9, acting upon the top surface of the insole will place indicating or guide marks thereon, and the type 169 and 176 will place on the heel seat portion of the insole marks to indicate the size and width of insole treated, it being noted that the location of these marks on the surface of the insole, which will eventually be covered by the outsole or heel, enables them to be readily seen during those operations of shoe construction yet hides them in the finished shoe.

It will be understood, of course, that the telescoping or yielding nature of the side gages 15 permits them to yield downwardly should the head 49 contact with them in its downward movement.

What is claimed and desired to be secured by Letters Patent is:—

1. A machine for acting upon the insole of a boot or shoe, comprising, in combination, a work support, a lip cutting tool constructed and arranged to cut a slash through the lip of the insole sustained upon said support a carrier for said lip cutting tool, a support for said carrier, means for relatively moving the lip cutting tool and work support to cut said slash through the lip, and means for adjusting the said lip cutting tool carrier on its support longitudinally of the insole in accordance with variations of dimensions of said insole.

2. A machine for acting upon the insole of a boot or shoe, comprising, in combination, a work support, a lip cutting tool constructed and arranged to cut a slash through the lip of the insole sustained upon said support, a carrier for said lip cutting tool, a support for said carrier, means for relatively moving the lip cutting tool and work support to cut said slash through the lip, and means for adjusting the lip cutting tool carrier on its support in accordance with the length size of said insole.

3. A machine for acting upon the insole of a boot or shoe, comprising, in combination, a work support, a lip cutting tool constructed and arranged to cut a slash through the lip of the insole sustained upon said support, a carrier for said lip cutting tool, a support for said carrier, means for relatively moving the lip cutting tool and work support to cut said slash through the lip, and means for adjusting the lip cutting tool carrier on its support longitudinally of the insole in accordance with variations in length size and width size of said insole.

4. A machine for acting upon the insole of a boot or shoe, comprising, in combination, a work support, a lip cutting tool constructed and arranged to cut a slash through the lip of the insole sustained upon said support, a carrier for said lip cutting tool, a support for said carrier, means for relatively moving the lip cutting tool and work support to cut said slash through the lip, and means for adjusting the lip cutting tool carrier on its support longitudinally of the insole in accordance with variations in length and width and style of said sole.

5. A machine for acting upon the insole of a boot or shoe, comprising, in combination, a work support, a lip cutting tool constructed and arranged to cut a slash through the lip of the insole sustained upon said support, a carrier for said lip cutting tool, a support for said carrier, means for relatively moving the lip cutting tool and work support to cut said slash through the lip, and means for adjusting the said tool carrier on its support to accord with variations in style of said sole.

6. A machine for acting upon the insole of a boot or shoe, comprising, in combination, a work support, a lip cutting tool constructed and arranged to cut a slash through the lip of the insole sustained upon said support, a carrier for said tool, means for relatively moving the lip cutting tool and work support to cut said slash through the lip, and means for varying the position of said tool carrier and tool to accord with variations in the style of heel to be employed in connection with said sole.

7. A machine for acting upon the insole of a boot or shoe, comprising, in combination, a work support, a lip cutting tool constructed and arranged to cut independent slashes through the lip at opposite edges of the insole sustained upon said support, means for relatively moving the lip cutting tool and work support to cut said slash through the lip, and a toe gage to position the toe of the sole longitudinally with respect to said lip cutting tool.

8. A machine for acting upon the insole of a boot or shoe, comprising, in combination, a work support, a lip cutting tool constructed and arranged to cut a slash through the lip of the insole sustained upon said support, means for relatively moving the lip cutting tool and work support to cut said slash through the lip, and a toe gage arranged to position the sole longitudinally with respect to the lip cutting tool in accordance with variations in length of said sole.

9. A machine for acting upon the insole of a boot or shoe, comprising, in combination, a work support, a lip cutting tool constructed and arranged to cut a slash through the lip of the insole sustained upon said support, means for relatively moving the lip cutting tool and work support to cut said slash through the lip, side gages, and a toe gage to position the sole upon said work support.

10. A machine for acting upon the insole of a boot or shoe, comprising, in combination, a work support, a lip cutting tool constructed and arranged to cut a slash through the lip at each edge of the insole near its heel end, means for relatively moving the lip cutting tool and work support to cut said slash through the lip, and means for positioning the insole on said support from the toe end thereof and according to a dimension of said sole.

11. A machine for acting upon the insole of a boot or shoe, comprising, in combination, a work support, a lip cutting tool constructed and arranged to cut a slash through the lip of the insole near its heel end, means for relatively moving the lip cutting tool and work support to cut said slash through the lip, and means acting on the toe end of the insole to position the insole on said support and to sustain the toe end thereof.

12. In a machine of the character described, the combination of a support for an insole, a lip cutting knife constructed and arranged to cut a substantially transverse slash in the lip of the insole, a carrier for said lip cutting tool, a support for the carrier, and adjusting means for moving the carrier on its support.

13. In a machine of the character described, the combination of a support for an insole, a lip cutting knife constructed and arranged to cut a substantially transverse slash in the lip of the insole, a carrier for said lip cutting knife adjustable longitudinally of the insole, and means carried by the knife and adjustable therewith to place a mark on the insole between the lips as a guide to the operative for subsequent operations.

14. In a machine of the character described, the combination of a work support, a lip cutting tool constructed and arranged to cut a substantially transverse slash in the lip of an insole adjacent the heel breast line, a heel contour tool, and means for relatively moving said tools and work support.

15. A machine for acting upon the insoles of boots and shoes, comprising, in combination, a work support, a lip cutting tool constructed and arranged to cut a slit in the lip of an insole sustained upon said support, a heel contour knife, means for relatively moving said tool and knife toward and from each other, and means for relatively moving said tool and knife and the work support.

16. A machine for acting upon the insoles of boots and shoes, comprising, in combination, a work support, a lip cutting tool constructed and arranged to cut a slit in the lip of an insole sustained upon said support, a heel contour knife, and means for varying the relation between said lip cutting tool and heel contour knife in accordance with variations in the dimensions of the insole being treated.

17. A machine for acting upon the insoles of boots and shoes, comprising, in combination, a work support, a lip cutting tool constructed and arranged to cut a slit in the lip of an insole sustained upon said support, a heel contour knife, and means for relatively moving said lip cutting tool and heel contour knife toward and from each other in accordance with variations in size and width of insole being treated.

18. A machine for acting upon the insoles of boots and shoes, comprising, in combination, a work support, a lip cutting tool constructed and arranged to cut a slit in the lip of an insole sustained upon said support, a heel contour knife, means for varying the cutting contour of said knife, and means for relatively moving said lip cutting tool and knife toward and from each other.

19. A machine for acting upon the insoles of boots and shoes, comprising, in combination, a work support, a lip cutting tool constructed and arranged to cut a slit in the lip of an insole sustained upon said support, a heel contour knife, means for varying the cutting contour of said knife in accordance with the dimensions of the insole to be treated, and means for moving the lip cutting tool toward and from the heel contour knife.

20. A machine for acting upon the insoles of boots and shoes, comprising, in combination, a work support, a lip cutting tool constructed and arranged to cut a slit in the lip of an insole sustained upon said support, a heel contour knife, size adjusting means for varying the contour of said knife in accordance with varying heel contours demanded by variations in sole length, and means for relatively moving the contour knife and lip cutting tool toward and from each other.

21. A machine for acting upon the insoles of boots and shoes, comprising, in combination, a work support, a lip cutting tool constructed and arranged to cut a slit in the lip of an insole sustained upon said support, a heel contour knife, size and width adjusting means for varying the contour of said knife in accordance with varying heel contours demanded by variations in sole length and width, and means for relatively moving the contour knife and lip cutting tool toward and from each other.

22. A machine for acting upon the insoles of boots and shoes, comprising, in combination, a work support, a lip cutting tool constructed and arranged to cut a slit in the lip of an insole sustained upon said support, a heel contour knife, means for varying the relation between said lip cutting tool and heel contour knife in accordance with variations in the dimensions of the insole being treated, and means operative through said first mentioned means for marking the sole to indicate its dimension.

23. In a machine of the character described, the combination of a work support, a lip cutting knife constructed and arranged to cut a transverse slit in the lip of an insole sustained upon said support, a heel contour knife to trim the heel edge of said insole, means to relatively adjust said knives toward and from each other in accordance with the length of heel seat demanded by variations in dimensions of the insole, and means operating with said knives for marking upon the insole the dimension thereof.

24. A machine for acting upon the insoles of boots and shoes, comprising, in combination, a work support, a lip cutting knife constructed and arranged to cut a slit in the lip of an insole sustained upon said support, a heel contour knife, and marking devices disposed between said knives to indicate the dimension of the sole produced.

25. A machine for acting upon the insoles of boots and shoes, comprising, in combination, a work support, a toe gage, means for operating the toe gage to move the work longitudinally upon said work support, a heel contour knife, and means for operating the same to trim the heel portion of the insole positioned by said gage upon the work support.

26. A machine for acting upon the insoles of boots and shoes, comprising, in combination, a work support, a toe gage, means for operating the toe gage to move the work longitudinally upon said work support, a heel contour knife having a beveled inner edge to form an inclined or diagonal cut, and means for operating the same to trim the heel portion of the insole positioned by said gage upon the work support.

27. In a machine of the character described, the combination of a head, a lip cutting knife carried by said head to cut a slash through the lip of an insole, a toe gage, and means for adjusting the lip cutting knife and toe gage.

28. In a machine of the character described, the combination of a lip cutting knife constructed and arranged to cut a slash through the lip of an insole, a work support, side gages to position the insole transversely on said support, and means acting upon the toe of the insole to position the insole longitudinally on said support for the action of the lip cutting knife.

29. In a machine of the character described, the combination of a work support, a head, a lip cutting knife constructed and arranged to cut a slash transversely through the lip of an insole sustained by said work support, said knife being mounted in said head, a heel contour knife carried by said head, means also carried by said head for placing a guide mark on the sole, and means for relatively moving the work support and said head.

30. In a machine of the character described, the combination of a work support, a head, a lip cutting knife mounted in said head, a heel contour knife, and means for relatively moving the work support and said knives to cause the latter to cut a slash through the lip of an insole sustained by said support and cut the heel portion to the desired contour.

31. In a machine of the character described, the combination of a work support, a lip cutting knife constructed and arranged to cut a slash through the lip of an insole sustained upon said support, a flexible heel contour knife to act upon the heel portion of the insole, and means for changing the relation of the lip cutting knife and heel contour knife for treating soles of different dimensions.

32. A sole cutting machine comprising means for supporting and positioning a channeled sole, and cutting means arranged to cut the lips of the channels adjacent the heel portion of the sole and for simultaneously cutting the heel contour.

33. A machine for acting upon the soles of boots and shoes, comprising, in combination, a work support, an oppositely disposed head, a heel contour knife mounted on one of said parts, a marking device to mark the sole, and means for adjusting the heel contour knife with relation to the marking device for variations in size of the sole being treated.

34. A machine for acting upon the soles of boots and shoes, comprising, in combination, a work support, an oppositely disposed head, a heel contour knife mounted on one of said parts, a marking device to mark the sole, and means for simultaneously adjusting the heel contour knife and marking device in accordance with variations in the size of the sole being treated.

35. In a machine for acting on the soles of boots and shoes, the combination of a work support, gaging means for positioning the sole upon said support, a lip cutting tool constructed and arranged to cut a slit in the lip of the sole sustained upon said support, and a heel contour knife for cutting the heel portion of the sole.

36. In a machine of the character described, the combination of a work support and an oppositely disposed head relatively movable toward and from each other, a lip cutting tool and a heel contour knife carried by one of said parts, and means for relatively moving the work support and head toward each other to cause the lip cutting tool to cut the lip of a sole and the heel contour knife to cut the heel contour.

37. In a machine of the character described, the combination of a work support and an oppositely disposed head, relatively movable toward and from each other, a lip cutting tool and a heel contour knife carried by one of said parts, means for relatively moving the work support and head toward each other to cause the lip cutting tool to cut the lip of a sole and the heel contour knife to cut the heel contour, and means for adjusting the relation of the work support and head for soles of different thickness.

38. In a machine of the character described, the combination of a work support and an oppositely disposed head relatively movable toward and from each other, a knife carried by one of said parts for cutting transversely of a shoe sole and partly through the same, a second knife carried by one of said parts for cutting about an edge portion of the sole through the entire thickness thereof, and means for relatively moving the work support and head to cause said knives to cut the sole.

39. In a machine of the character described, the combination of a work support and an oppositely disposed head relatively movable toward and from each other, means for positioning a shoe sole on said support, a knife carried by one of said parts for cutting transversely of a shoe sole, and partly through the same, a second knife carried by one of said parts for cutting about an edge portion of the sole through the entire thickness thereof, and means for relatively moving the work support and head to cause said knives to cut the sole.

40. In a machine for acting upon the insoles of boots and shoes, the combination of a work support, a head, a lip cutting tool constructed and arranged to cut a slit in the lip of an insole sustained upon said support, and a toe gage for positioning the insole on said support, said gage comprising portions for positioning the toes of rights and lefts.

41. In a machine of the character described, the combination of a work support, a knife movable toward and from the work support to cut transversely of a shoe sole on said support and partly through the same, a second knife for cutting about an edge portion of the sole through the entire thickness thereof, and means for yieldingly moving the first-mentioned knife to cut transversely of the shoe sole and for positively operating the second-mentioned knife.

42. In a machine for treating the insoles of boots and shoes, the combination with a work support of a lip cutting knife constructed and arranged to cut a slit in the lip of the insole, means for adjusting the position of the lip cutting knife longitudinally of the insole in accordance with the length size of said insole, and means for additionally moving the said knife longitudinally for variations in width size of said insoles.

43. In a machine for treating the insoles of boots and shoes, the combination with a work support of a lip cutting knife constructed and arranged to cut a slit in the lip of the insole, means for adjusting the position of the lip cutting knife longitudinally of the insole in accordance with the length size of said insole, means for additionally moving the said knife longitudinally for variations in width size of said insoles, and means for still further adjusting said knife longitudinally for variations in style of insole.

44. In a machine of the character described, the combination of a work support, a knife for making a transverse cut in an insole sustained by said support, a contour knife for cutting about a contour of the insole sustained by said support, and means for adjusting the position of the first-named knife in a direction longitudinally of the insole and for changing the contour of the contour knife.

45. In a machine for treating insoles of boots and shoes, a work support, a contour knife for cutting about the contour of an insole sustained by said support, means for positioning an insole on said support for the action of the contour knife and devices for simultaneously adjusting said means and changing the contour of the said knife.

In testimony whereof, I have signed my name to this specification, in the presence of two subscribing witnesses.

THOMAS G. PLANT.

Witnesses:
 ALFRED H. HANDLEY,
 FRANCIS H. ROWSOM.